United States Patent [19]

Fritzsche et al.

[11] Patent Number: 5,540,215
[45] Date of Patent: Jul. 30, 1996

[54] METHOD AND APPARATUS FOR HEATING A LIQUID

[75] Inventors: Donald E. Fritzsche, Chicago Heights, Ill.; Paul E. George, Powell, Ohio

[73] Assignee: Gas Research Institute, Chicago, Ill.

[21] Appl. No.: 436,500

[22] Filed: May 8, 1995

[51] Int. Cl.[6] .................................................. A47J 27/00
[52] U.S. Cl. .............................. 126/374; 126/378; 99/403
[58] Field of Search .................................... 126/378, 366, 126/376, 377, 374, 585–587, 351; 99/403

[56] References Cited

U.S. PATENT DOCUMENTS

| | | | |
|---|---|---|---|
| 1,127,899 | 2/1915 | Koppitz et al. | 126/378 |
| 2,483,275 | 9/1949 | Gregor | 126/374 |
| 2,756,425 | 7/1956 | Webber | 126/378 |
| 3,556,199 | 1/1971 | De Gvoote | 126/366 |
| 3,670,807 | 6/1972 | Muller | 126/366 |
| 3,985,120 | 10/1976 | Lazaridis et al. | 126/378 |
| 4,091,801 | 5/1978 | Lazaridis et al. | 126/378 |
| 4,905,664 | 3/1990 | Dunham | 126/391 |
| 5,398,668 | 3/1995 | Daneshvar et al. | 99/403 |

*Primary Examiner*—Carroll B. Dority
*Attorney, Agent, or Firm*—Dick and Harris

[57] ABSTRACT

A method and apparatus for heating a liquid, such as cooking oil for a fryer. A heat transfer fluid, such as an oil, is heated, such as by a gas-fired burner, at a location remote from the liquid to be heated, and passed by the liquid in a heat exchange relationship, so as to more accurately control the transfer of heat into the liquid to be heated. The invention also includes an advantageous combination pivot and valve mechanism for controlling the flow of heat transfer liquid through the liquid to be heated.

11 Claims, 3 Drawing Sheets

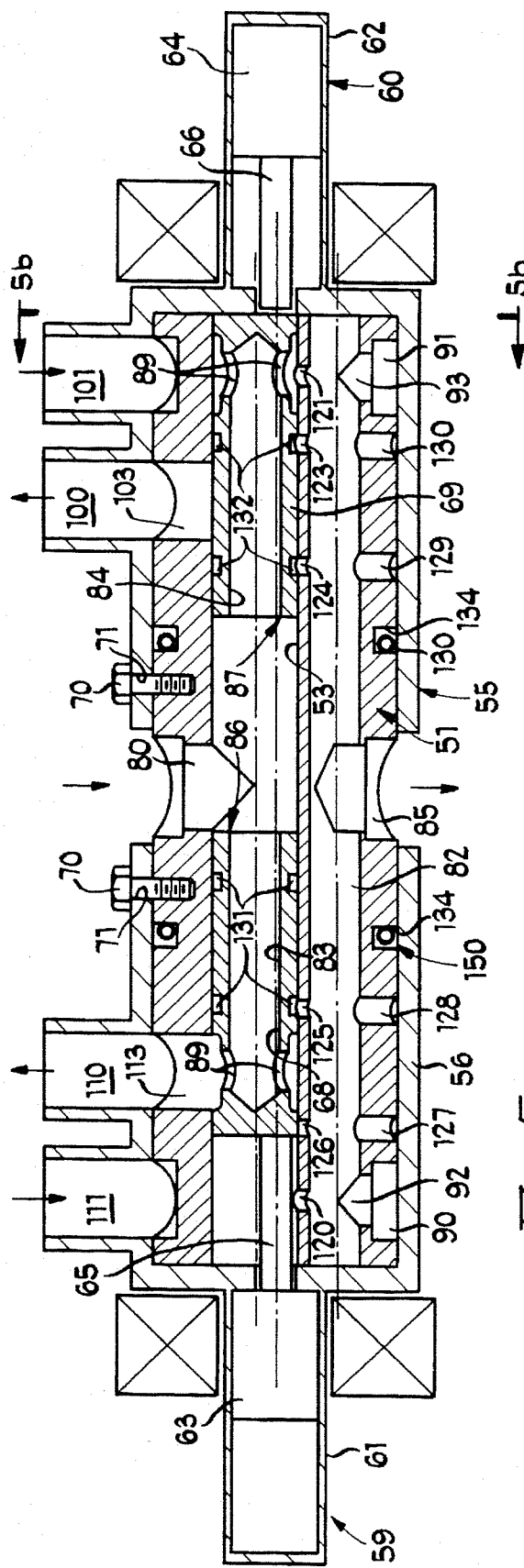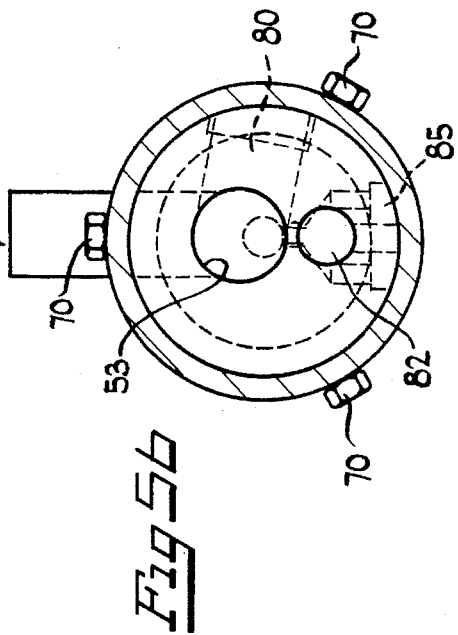

METHOD AND APPARATUS FOR HEATING A LIQUID

FIELD OF THE INVENTION

The present invention relates to the field of apparatus and methods used for heating liquids, and in particular, to apparatus and methods for heating liquids such as cooking oils.

BACKGROUND OF THE INVENTION

Apparatus for heating liquids, and in particular for heating cooking oils, such as deep fat fryer-type apparatus, especially such apparatus as are used in commercial environments, such as fast food restaurants, must be able to function under conditions and circumstances which are not encountered in residential environment circumstances.

For example, in a typical residential cooking situation, a pot, kettle or frying pan is filled with, at most, a pint or so of oil, used for at most a few loads of food to be cooked, and then the oil is discarded, or "recycled" in the kitchen for a lesser use. In a commercial environment, however, several gallons of increasingly more expensive cooking oil are placed in a fryer at one time, are then used for repeated loads of food to be cooked, and the oil typically remains in the fryer for as long as the oil can be made to last.

The oil, of course, is in many ways a fragile ingredient. Indeed, as with extended or excessive heating, the oil may begin to chemically break down, and become unacceptable for cooking. In addition, the oil is exposed to thermal cycling, as heat is applied, and removed either through the application of the heat, or through absorption of the heat by the relatively cold food articles.

The operation of such a fryer must attempt to meet several competing goals. It is desired to maintain the oil at a sufficiently hot temperature to minimize absorption of the oil in to the food items, but at the same time not be wasteful of heating energy. Furthermore, the oil must not get so hot that chemical breakdown or fire becomes a concern.

An additional goal of such fryer apparatus is to apply the heat in as uniform manner as possible, so that there are no "hot" or "cold" regions in the fryer, which may affect the taste and quality of the food items, as well as representing wasted heating energy.

Electrically-heated fryers, of course, are capable of fine control of the rate and amount of heat which may be put into the cooking oil. However, electrical resistance heating of cooking oil can be expensive in terms of energy cost. Gas-fired fryers, which can be more efficiently operated, have been known to be difficult to operate and control. In addition, heating of oil by direct heating of a vessel by flame, creates thermal stresses in both the vessel and the burners, leading to shortened useful life, and increased operating costs.

One known method for heating a liquid such as a cooking oil, which comprises such an attempt to meet the several competing goals previously mentioned, is to pass a heat transfer fluid in a heat transfer relationship, past or through a cooking oil. The heat transfer fluid is first heated at a position thermally, if not physically, remote from the cooking oil.

For example, in Dunham, U.S. Pat. No. 4,905,664, a gas-fired grill is provided with a series of tubes, through which the hot combustion product gases are passed. The heated tubes may be used as a grilling surface, or the tubes may be immersed, so as to provide a heating source for cooking oil.

One potential drawback of the Dunham '664 patent, however, is that the amount and rate of heat which the combustion gases can transfer is relatively limited. If a substantial load, such as a large quantity of frozen food, is placed in the cooking oil, whatever heat is in the oil may be quickly absorbed, and the fan-drawn combustion gases simply may not be able to quickly replenish the heat so as to maintain the oil at an acceptable temperature, resulting in thermal cycling of the oil and potential risk of absorption. Even if the gas supply were substantially stepped up, fine control of the heat applied would be difficult, creating potential hot spots in the oil.

Another prior art apparatus is disclosed in Lazaridis et al., U.S. Pats. Nos. 3,985,120 and 4,091,801. In these references a fryer construction comprising an open-topped cooking vessel which has a bottom and/or side portion which shares a common wall with a sealed chamber in which a fluid is contained, is disclosed. The sealed chamber ideally contains only the liquid and/or gaseous phases of a vaporizable heat transfer fluid, with no other non-condensable material in the chamber. The principle of operation of this apparatus is that the heat transfer fluid is heated to vapor in a lower or removed portion of the sealed chamber, and condenses against the cooler wall which is shared by the cooking vessel. In this manner, heat is transferred to the cooking oil, so long as the cooking oil is at a heat and temperature lower than the heat of condensation of the heat transfer fluid vapor, in theory preventing overheating of the cooking oil.

However, the apparatus disclosed in the Lazaridis et al. patents require the maintenance of a specially constructed sealed chamber, which increases manufacturing costs. In addition, the very process which is used to prevent overheating of the cooking oil limits the available rate at which heat can be delivered to the oil, which in turn limits the rate at which the cooking oil can recover from a large load, such as a large quantity of frozen food being lowered into the cooking oil. The cooking oil can only be heated as fast as the transfer fluid can be boiled, transported by convection to the common wall, lose its heat through the common wall, condense, and be reheated. Even if the transfer fluid is continuously heated, which would be wasteful, so as to establish a more-or-less steady-state situation, as mentioned previously, a vapor-to-liquid heat transfer is a less efficient process than, for example, a liquid-to-liquid transfer process. Still further, the usage of a common heating wall, results in the cooking oil becoming heated from the common wall outward (or upward), thereby resulting in an unavoidable temperature gradient from bottom to top or from side to side, of the volume of cooking oil.

It is, accordingly, desirable to provide a method and apparatus for indirectly heating a volume of cooking oil, through indirect means, such as a heat transfer fluid heated at a position thermally and/or physically remote from the cooking oil, which is capable of close control of the rate of heat transfer into the cooking oil.

It is additionally desirable to provide such a method and apparatus which is capable of supplying, on demand and at an enhanced rate, large quantities of heat to the cooking oil, such as upon substantially loading of the cooking oil with large amounts of cold or frozen food to be cooked.

It is further desirable to provide such a method and apparatus in which the supply of heat to the cooking oil may be quickly curtailed, such as when the load on the cooking oil is removed, such as by removal of the cooked food, which may still be substantially cooler than the cooking oil.

SUMMARY OF THE INVENTION

The present invention is a method for heating a liquid comprising:

placing a liquid to be heated in a vessel;

heating a quantity of a heat transfer liquid at a location thermally remote from the vessel;

transporting some of the heated transfer liquid into the liquid in the vessel, in such a manner that the liquid to be heated and the heat transfer liquid are physically separated, but in a heat transfer relationship so that the heat from the heat transfer liquid is transferred, at least in part, to the liquid to be heated;

sensing the temperature of the liquid to be heated;

providing additional heated heat transfer liquid, to displace the prior liquid after it has transferred a predetermined amount of heat;

continuing to replace the heated heat transfer liquid with additional heated heat transfer liquid until the liquid to be heated has attained a predetermined temperature.

In a preferred embodiment of the invention, the method further comprises the steps of:

continuing to monitor the temperature of the liquid to be heated; and maintaining the temperature of the liquid to be heated by providing a continuous flow of the heat transfer liquid, when the temperature of the liquid to be heated drops to a predetermined temperature, until the liquid to be heated is raised to a desired temperature.

The step of providing additional heated heat transfer liquid, to displace the prior liquid after it has transferred a predetermined amount of heat further comprises reducing the amount of heated heat transfer liquid transported, as the temperature of the liquid to be heated increases, until the liquid to be heated attains a predetermined temperature.

In a preferred embodiment of the invention, the liquid to be heated is a cooking oil, while the heat transfer liquid is a non-toxic mineral oil.

The invention also comprises an apparatus for heating a liquid, wherein the apparatus includes a vessel for containing a first liquid to be heated to a desired temperature; means for heating a second, heat transfer liquid to a desired temperature, operably disposed at a location thermally remote from the vessel; means for storing heated heat transfer liquid; means for transporting some of the heated heat transfer liquid from the means for storing heated heat transfer liquid to the vessel for containing the first liquid; and means for enabling transfer of heat from the transported heated heat transfer liquid to the first liquid, operably connected in a fluid transporting relationship with the means for transporting heated heat transfer liquid, while preventing physical contact between the first liquid and the heat transfer liquid.

The apparatus also includes means for monitoring the temperature of the first liquid; and means for replacing the transported heated heat transfer liquid with additional heated heat transfer liquid, when the transported heated heat transfer liquid has substantially completed transfer of heat to the first liquid.

In a preferred embodiment of the invention, the means for heating a second, heat transfer liquid comprises a gas burner.

The means for storing heated heat transfer liquid preferably comprises a supply manifold for holding heat transfer liquid; and a supply heat exchanger operably disposed in a heat conducting relation between the means for heating the heat transfer liquid and the supply manifold.

The means for transporting heated heat transfer liquid from the means for storing heated heat transfer liquid to the vessel for containing the first liquid comprises at least one liquid transporting member operably connected to the supply manifold, for enabling transport of heat transfer liquid back and forth between the supply manifold and the vessel, while the means for enabling transfer of heat from the heated heat transfer liquid to the first liquid comprises a vessel heat exchanger member, operably connected to the at least one liquid transporting member, for immersion in the first liquid within the vessel.

The invention further comprises pumping means operably disposed between the vessel heat exchanger and the supply manifold.

The apparatus also comprises means for reducing the amount of heated heat transfer liquid transported, as the temperature of the liquid to be heated increases, until the liquid to be heated attains a predetermined temperature.

The invention also includes a pivot valve apparatus for pivotally supporting the fluid circulating loop(s) for the fryer. The pivot valve apparatus has integrated within it a valve mechanism for controlling the flow of the heat transfer fluid through the fluid circulating loops. The heated heat transfer fluid passes through the pivot valve apparatus on the way to the fluid circulating loop(s) and on the way back from the loop(s) to the heat transfer fluid reservoir. The valve mechanism is preferably solenoid driven to open and permit fluid flow through the circulating loops, and is preferably biased shut by fluid pressure to a closed position. In addition, the pivot valve apparatus is preferably configured so as to cut off the flow of fluid into the apparatus, when the circulating loops are raised out of the cooking oil, such as for cleaning.

The invention includes a pivot valve apparatus for pivotally supporting an apparatus for circulating a fluid and for regulating the flow of fluid through the apparatus for circulating the fluid. In particular, the pivot valve apparatus comprises support means operably affixable to a base member; inlet means, operably associated with the support means, for receiving flow of the fluid from a source; outlet means, operably associated with the support means, for directing flow of the fluid from the pivot valve apparatus back to the source; means for pivotally supporting the fluid circulating apparatus relative to the base, operably associated with the support means; means, operably associated with the support means, the inlet means, the outlet means and the pivotable support means, for defining a plurality of potential fluid flow paths in said pivot valve apparatus, between the fluid circulating apparatus and the fluid source; valve means, operably associated with the pivotable support means, for directing flow of the fluid alternatively along one of the plurality of potential fluid flow paths, from the inlet means to the fluid circulating apparatus, from the fluid circulating apparatus to the outlet means, and directly from the inlet means to the outlet means.

In addition, the support means includes a support member, and the means for defining a plurality of potential fluid flow paths comprises at least two interconnected fluid passages disposed therein.

The inlet and outlet means are operably disposed on the support member, and open upon different ones of the at least two interconnected fluid passages disposed therein. In a preferred embodiment of the invention, the fluid circulating apparatus includes at least one fluid conducting loop having a fluid receiving end and a fluid discharging end, and the means for pivotally supporting the fluid circulating apparatus comprises at least one pivot member, being configured for pivotable movement relative to the support member, in which the at least one pivot member having at least one fluid passage operably disposed therethrough, and the at least one fluid passage being operably associated in fluid communication with at least one end of the fluid circulating apparatus, the fluid circulating apparatus being operably affixed to the at least one pivot member.

In a preferred embodiment, wherein the support member is a cylindrical member, the at least one pivot member includes a substantially hollow cylindrical portion fitted about the support member for rotation about at least portion of the support member.

Preferably, the valve means comprises at least one valve member operably disposed in one of said at least two interconnected passages, for selective movement therein for selectively opening up and closing off the potential fluid flow paths. The invention also includes means for selectively moving the at least one valve member, and means for closing the inlet means, so as to preclude entry of the fluid into the pivot valve apparatus, when the fluid circulating apparatus is pivoted about the pivot valve apparatus from a first position, to a second position.

BRIEF DESCRIPTION OF THE DRAWINGS

FIG. 5a is a top plan view, in section, of the pivot valve apparatus according to the present invention; and FIG. 5b is an end view, in section, taken along line A—A of FIG. 5a.

BEST MODE FOR PRACTICING THE INVENTION

Figure 1:
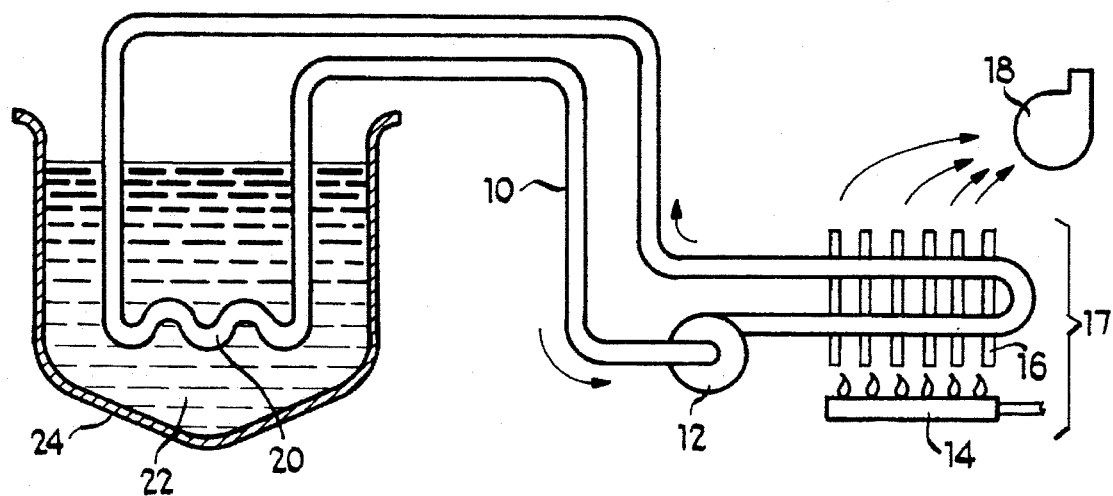
FIG. 1 is a schematic representation of the method for heating a liquid, according to the present invention.

While this invention is susceptible of embodiment in many different forms, there is shown in the drawings and will be described in detail herein, a preferred embodiment, with the understanding that the present disclosure is to be considered as an exemplification of the principles of the invention, and is not intended to limit the invention to the embodiment illustrated.

A simplified schematic of the apparatus and method for heating a liquid, such as a cooking oil, is illustrated in FIG. 1. The apparatus will include a heat transfer fluid (HTF) loop 10, which, in the embodiment of a fryer, will be filled with an FDA-approved oil ("HTF oil"). Pump 12 is provided to circulate the HTF oil, in a manner described hereinafter. Burner 14, which preferably may be a high-efficiency gas burner of known design, is provided for burning of the fuel gas which may be natural gas, propane, or any other suitable fuel gas. A portion of loop 10 passes through a primary heat exchanger 16, to pick up heat from burner 14. Burner 14 and primary heat exchanger 16 together may make up HTF oil heater unit 17. Primary heat exchanger 16 will include a supply manifold (not shown, but which may be of known construction) which will be able to hold a supply quantity of HTF oil, which will have a volume greater than the total volume of HTF oil in the remainder of loop 10. Fan 18 may be provided, as necessary, to provide induced draft for the combustion products, to promote efficient combustion and to safely remove the combustion gases, as the installation and use environment may require.

Loop 10 also includes cooking vessel heat exchanger portion 20, which is intended to be submerged in the cooking oil 22, in cooking vessel 24. The cooking vessel 24 will preferably be provided with a temperature sensor/temperature controller (not shown, but which may be of known design) which will monitor the temperature of the cooking oil, and be connected to the HTF heater 17 and pump 12, so as to "call" for increased flow of heated HTF oil, when the temperature of the cooking oil 22 drops below a predetermined value, or to stop the flow of HTF oil when the temperature of the cooking oil 22 rises above another predetermined value.

Figure 2:
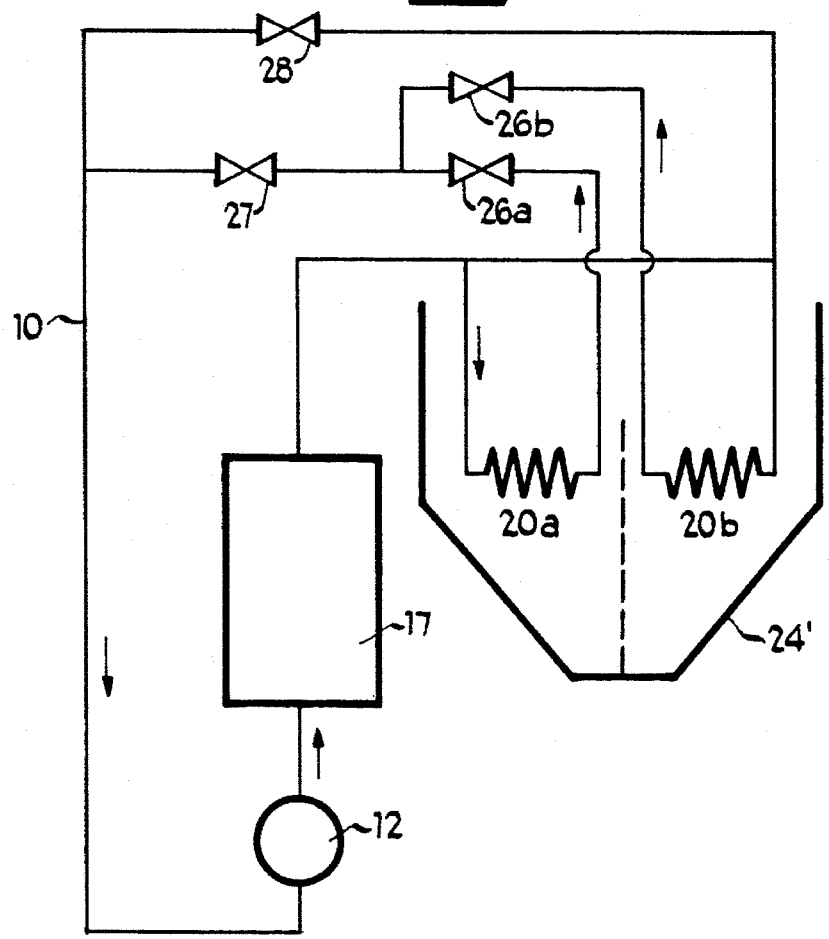
FIG. 2 is a further schematic representation of a modified version of the method for heating a liquid, according to the present invention.

Additional mechanical aspects of the invention are illustrated in FIG. 2, which also illustrates a modification of the method and apparatus, for possible use with a double or split vat fryer apparatus, in which like elements to the previous embodiment are provided with like reference numerals. Loop 10 is routed through pump 12 and HTF oil heater 17 (preferably comprising a burner and primary heat exchanger, as in the prior embodiment). The flow of HTF oil in loop 10 then splits into cooking vessel heat exchangers 20a and 20b, in split cooking vessel 24'. Flow of the HTF oil is controlled through regulation of the speed of pump 12, as well as by the operation of valves 26a and 26b, and pressure control valve 28. With this configuration, it can be seen that by through advantageous operation of valves 26a and 26b, the flow rate through heat exchangers 20a and 20b can be made to differ from one another, so as to provide different rates of heating for the different portions of split cooking vessel 24', for different temperatures and/or rates of cooking.

The apparatus of the present invention, as illustrated in FIG. 2, is intended to be fabricated as simply as possible, for ease of installation, maintenance, and possible conversion to different applications. For example, the split vat configuration just described may be reconfigured to a single vat operation, simply by the removal or deactivation of valves 26a and 26b, and the installation of a single valve 27 at an upstream position. The flow rates of the HTF oil through heat exchangers 20a and 20b will then be matched.

In a preferred embodiment of the invention, valves 26a, 26b and/or 27 may be solenoid valves, although other suitable, mechanically reliable and simple valves may be employed.

In the embodiment of a fryer, the HTF oil may preferably be an FDA-approved non-toxic mineral oil having a low viscosity (such as 1 centipoise at operating temperature), a modest heat capacity of approximately 0.6 BTU/lbm/° F., and minimal fouling tendencies.

Operation of the apparatus, in either of the embodiments of FIGS. 1 and 2, involves separate control of the primary heat exchanger portions relative to the cooking vessel heat exchanger portions. For example, primary heat exchanger 16 holds HTF oil in the supply manifold at a design temperature, such as in a range of 475° F. to 500° F. A temperature controller may be connected to the supply manifold to control the burner to maintain the HTF oil in the supply manifold in such a temperature range. The burner 14, pump 12 and a flow control valve, such as valve 27, may also be interconnected with the temperature controller, so as to ensure that the HTF oil in the supply manifold will be protected from overheating.

The purpose of the supply manifold is to create a reservoir of adequately heated HTF oil, which may be pumped through the cooking vessel heat exchanger 20 (20a and 20b) upon a call transmitted by the cooking vessel temperature controller, which will open valve(s) 26a and/or 26b or 27, and enable flow of HTF oil through cooking vessel heat exchanger 20. Pump 12 may also be actuated at the same time to assist in the rapid supply of freshly heated HTF oil. The temperature of the cooking oil may be monitored by the temperature controller such that if the rate of temperature rise, relative to the sensed temperature of the cooking oil falls, then the temperature controller will "call" for more heat, and the heated HTF oil will be supplied continuously, although possibly at a reduced rate of flow, until the temperature controller is satisfied. The pump will stop, and when the temperature in the supply manifold is restored, the burner will shut off.

The temperature controller may include appropriate temperature sensors, and may further include user adjustable and/or programmable elements, so that the various set temperatures of the HTF oil and of the cooking oil may be adjusted by the contemplated users, within predetermined safety limits built into the apparatus. Computerized control apparatus as may be known in the art may likewise be used to control the general and specific operations of the apparatus.

The heat requirements of a cooking vessel, during a particular cooking cycle, will varying during the cooking of a particular load of food items, and the amount of variation depends, in great part, upon the total mass of food being cooked during that cycle, and the temperature of the food mass. For example, a large load of frozen food items will put a substantial heat load upon the cooking oil in the vessel. As the mass of food items heats up, heat is taken from the oil, which must be supplied by the heat source. As the food mass temperature begins to rise, less and less heat needs to be added to the cooking oil, in order to maintain the appropriate cooking temperature, while preventing excess heat from being added which would present a potential of overcooking or possibly dangerous overheating of the cooking oil.

By maintaining a reserve of heated HTF oil at a position remote from the cooking vessel 24, the apparatus of the present invention is capable of delivering large or small amounts of heat to the cooking oil, as may be required by the cooking vessel temperature controller. It is believed that the best commercial fryers currently available are capable of delivering heat to cooking oil at a maximum rate of 58,000 BTU/hr (17 KW), most fryers having lower rates. Typical operating procedures for such fryers is to apply heating power continuously, with each new load of food items being loaded, as soon as appropriate cooking temperature is restored after unloading the previous load. The fryers are typically designed for operations at a predetermined average food item load size. It is believed that such operations cannot adequately accommodate varying size food item loads, such that light loads will be overcooked, while oversized loads will take too much heat from the cooking oil, and with temperature recovery being slower, will be undercooked and/or suffer from cooking oil absorption.

Apparatus constructed according to the present invention are contemplated as being able to have a nominal heat input rate which may be exceeded by 20–50%, as may be required by the demands of loads of varying size, density, and initial temperature.

Figure 3:
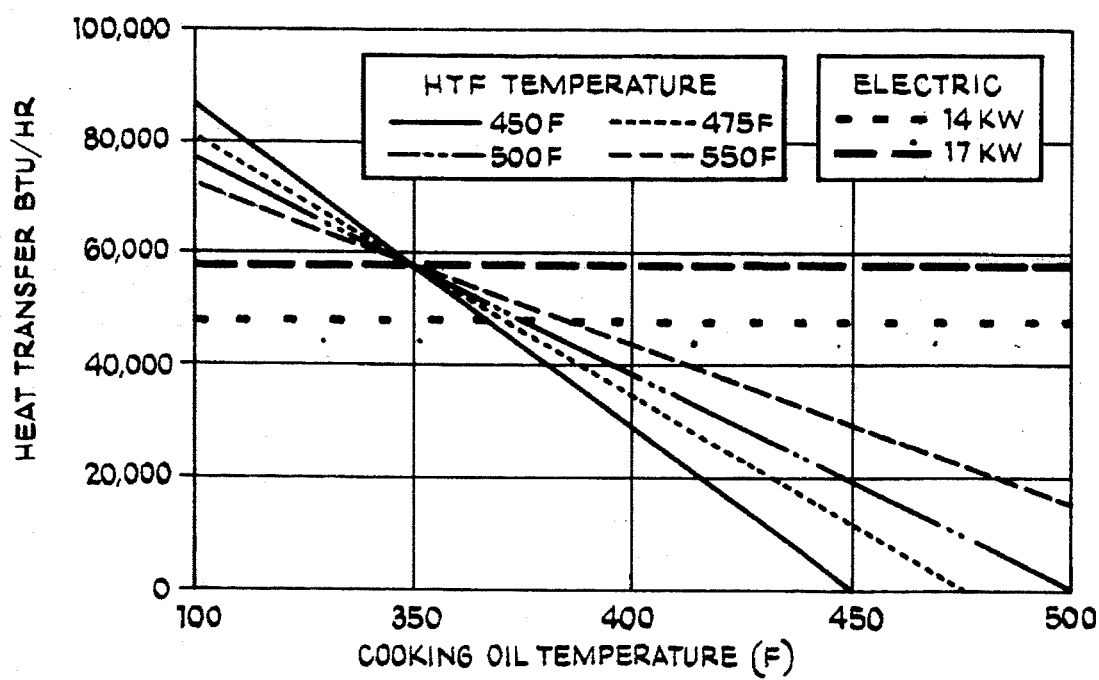
FIG. 3 is a graphic representation of the performance of an apparatus according to the present invention, relative to the performance of other apparatus for heating liquids.

FIG. 3 illustrates the anticipated potential performance of cooking apparatus constructed according to the present invention, as compared to the performance of known electric fryers, based upon an equivalent amount of energy being transferred to the cooking oil for maintaining the cooking oil at 350° F.

Since the transfer fluid will be maintained at a lower temperature than a direct flame or electrical resistance heater would apply to a cooking vessel, the apparatus of the present system will require a greater surface area for the cooking vessel heat exchanger 20, than would be employed with a direct flame or electrical resistance heater. It is anticipated that, based upon the parameters specified, an HTF oil system, based upon an HTF oil temperature of 450° F. will be capable of transferring 30,000 BTU/hr (8 KW) more to the cooking oil at 300° F. than an electric element, even though the temperature of an electric coil will typically far exceed the desired temperature to which the cooking oil is to be heated. This initial heat delivery falls off, as the HTF oil loses heat to the cooking oil (which, in turn, loses heat to the cold food items and to the ambient). However, such large heat delivery is not needed during the latter stages of any given cooking cycle, as previously mentioned. Accordingly, the present invention is an advance over the prior art, in that it is capable of delivering additional heat during those periods of a cooking cycle when additional heat is required.

If an electric coil is turned off, during such latter portions of a cooking cycle, so as to prevent the delivery of excess heat, then the coil must be turned back on, with a requisite extended "warm-up" recovery time. In the present invention, by contrast, additional heat may be quickly supplied simply by pumping heated HTF oil from the supply manifold reservoir.

For applications desiring to cook at 375° F., rather than 350° F., an HTF oil system, based upon the previously stated parameters, would not provide the same heat input as the electric coil system. Increasing the HTF oil temperature (for example, to 525° F.) or the cooking vessel heat exchanger size, would accommodate the need for additional heat delivery. The preferred alternative would be to increase the HTF oil temperature, as this would effect a movement of the performance curve illustrated in FIG. 3 to the right, but without changing its slope, so that the low temperature performance superiority over electric coil fryers would be maintained.

The present invention is also provided with several safety advantages over prior art apparatus. In an HTF oil system, the rate of heat input into the cooking oil falls off sharply, once the design temperature of the cooking oil is exceeded.

In an electric fryer, heat is delivered at a constant rate, regardless of the cooking vessel temperature. A 17 KW fryer will create a cooking oil temperature rise of approximately 29° per minute, if the temperature controller fails.

In contrast, an HTF oil fryer will transfer less heat as the cooking oil temperature increases, so that a designed initial temperature rise of 70° F. per minute for the cooking oil from room temperature may drop to less than 10° F. per minute as the oil temperature rises above 450° F. and will go to zero as the cooking oil temperature approaches the HTF oil temperature. The reduced rate of induced temperature rise will allow more time for reaction by the human operator, as well as the fryer control system. In addition, the vat temperature can never exceed the HTF oil temperature.

If cooking oil level in an electric fryer, having submerged electric heating elements, is allowed to drop far enough to even partially expose the heating elements, since the electric elements continue to deliver heat at a constant rate, the temperature of the surrounding cooking oil may quickly rise to ignition temperature. Accordingly, electrical element sheath temperature sensors, for example, are required on electric fryers. However, an HTF system according to the present invention will not reach autogenous ignition, and may only reach flash temperature (temperature at which the oil would burst into flame in the presence of a separate ignition source; approximately one hundred degrees lower than ignition temperature) through the failure of the cooking vessel temperature controller, the supply manifold temperature controller, the pump control and the burner control among other components.

A further operational advantage to the present invention is that the supply of heated HTF oil can be controlled during the initial warmup (melt cycle) of a fryer, so as to prevent excessive and uneven, potentially damaging and dangerous heating of the cooking oil or fat during warmup, as compared to directly heated gas-fired or electrically heated fryers which will immediately apply high-temperature heat to the oil.

In particular, the present invention allows for a finely controlled start-up from cold, which is advantageous when the cooking medium is a solid fat material, such as lard or the like. Heating will be rapid, but controlled so as to prevent undesirable chemical breakdown or changes in the chemical properties of the fat during initial warm-up. Once the fat material has melted and begun to heat up, then the heating rate can be increased.

Figure 4:
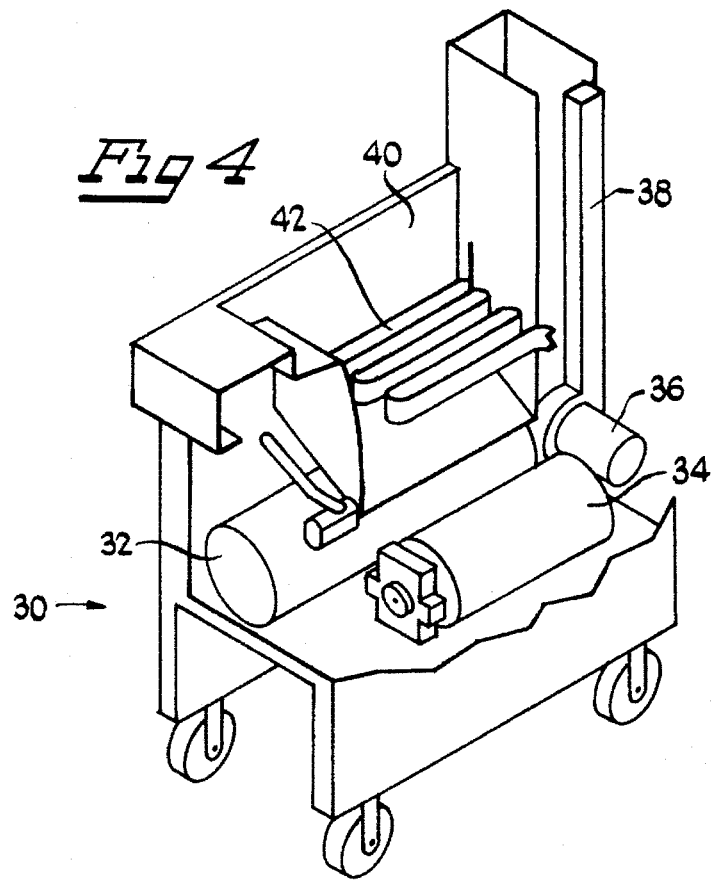
FIG. 4 is an illustration of an apparatus for practicing the method for heating a liquid, according to the present invention.

FIG. 4 illustrates a contemplated physical commercial embodiment of an HTF oil fryer, according to the present invention, which may be constructed in the form of a cart 30 having wheels. Cart 30 will house the HTF oil heat exchanger and supply manifold 32, the pump 34, the burner fan 36, an upwardly extending exhaust chimney 38 (which may be connected to a suitable exhaust vent or other system supplied by the establishment). The cooking vessel 40 will have an upward opening, and the cooking vessel heat exchanger loops 42 will be positioned toward, but not at the bottom of the cooking vessel.

In a preferred embodiment of the invention, the HTF unit may be configured, such that the cooking vessel heat exchanger loops 42 may be movable, so as to be raisable or lowerable relative to a cooking vessel, for facilitated cleaning and/or maintenance. The vessel heat exchanger loops will be pivotally attached to the back wall 44 of the cart 30, where chimney 38 is housed, so as to enable loops 42 to be swung upwardly and backwardly, out of the cooking oil/fat, in order to permit cleaning. Back panel 44 may also support basket lifts (not shown) for handling the food items, as may be desired. The burner components are preferably isolated from the cooking vessel, such that the burner components will be protected from airborne oil, dust, and so on, and yet can be accessible, as desired, for repair, cleaning and maintenance.

In a preferred embodiment of the invention, the fryer apparatus of cart 30 (or other installation) will include the following novel pivoting connection for connecting loop 42. Pivot apparatus 50 (FIGS. 5a and 5b), as illustrated, is configured for a fryer having side by side separate cooking vessels. In an alternative embodiment of the invention, pivot connection 50 can be configured for a single vessel, through modifications of the following configuration, which will be readily obtained upon review of the following disclosure.

One important aspect of the present invention is that it would be desirable to provide for a pivoting construction, which would allow the heat exchanger loop 42 to be lifted out of the cooking oil or fat, and halt the flow of heat transfer fluid into the loop, but permit continuous flow of the heat transfer fluid from and back to the reservoir where the heat transfer fluid is being heated.

Pivot apparatus 50 includes pivot pin 51, into which shuttle valve bore 53 is provided. End caps 55 and 56 fit over the ends of pivot pin 51. Solenoids 59, 60, have coils 61, 62, and armatures 63 and 64, to which shafts 65 and 66, respectively, are affixed. Valve spools 68, 69 are affixed to and/or are in contact with shafts 65 and 66, respectively.

In a preferred embodiment of the invention, pivot pin 51 will be mounted in a fixed position, relative to the fryer apparatus cart 30. End caps 55, 56 are configured to pivot around pin 51. Bolts 70, which are affixed to pin 51, extend through partially circumferentially extending grooves 71 in end caps 55, 56. Each groove 71, of which in the preferred embodiment there are three for each end cap, describes an arc of approximately 90°.

Pivot pin 51 has supply channel 80 formed therein, which extends from the outside surface of pivot pin 51, into valve bore 53. Pivot pin 51 also has an axially extending return channel 82, which extends parallel to, but is substantially isolated from, supply channel 80.

Each of valve spools 68, 69 is formed as a hollow cylindrical body, having central open passages 83, 84, and inward openings 86, 87, and exit openings 88, 89. Exit openings 88, 89 are situated in circumferentially extending grooves, so that flow will be enabled through spools 68, 69, without regard to the angular orientation of spools 68, 69, so long as the spools are axially aligned with either a supply opening and channel or a return opening and channel. Spools 55, 56 includes circumferentially relief channels 132, 131, respectively. Fluid pressure will always tend to force the spools outwardly, so as to tend to stop flow of fluid, unless the respective spools are held in their open positions by their respective solenoids.

Pivot pin 51 also has return relief channels 90, 91, which extend completely around pin 51, and include return openings 92, 93, which extend from channels 90, 91, and open into return channel 82, such that no matter what rotational position caps 55, 56 are in, relative to pin 51, the return channel 82 is always open, leading to return exit 85.

Cap 55 includes supply outlet 100, and return inlet 101. Supply outlet 100 is configured to align substantially precisely with supply opening 103 of pin 51, when cap 55 is rotated into a position, corresponding to the tubes 42 being lowered into the cooking oil. However, when the tubes 42 (and accordingly, cap 55) are rotated upwardly out of the oil, outlet 100 and opening 103 become unaligned, and supply of heating fluid to the tube connected to outlet 100 is cut off.

Similarly, cap 56 includes supply outlet 110, and return inlet 111. Supply outlet 110 is configured to align substantially precisely with supply opening 113 of pin 51, when cap 56 is rotated into a position corresponding to tubes 42 being lowered into the cooking oil.

Pivot pin 51 also includes return passages 120, 121, as well as relief openings 123–126, and relief channels 127–130.

The operation of pivot joint 50 is as follows: Assume that caps 55, 56 have been rotated, so as to place the tubes 42 into the cooking oil/fat. Solenoids 59, 60, which are suitably connected to a control apparatus, in a known manner, are actuated so as to drive spools 55 and 56 inwardly, that is, to the position of spool 56 in the left side of FIG. 5a (for facilitating illustration, only spool 56 is shown in the "open" position).

Heat transfer liquid enters bore 53, passes along passages 83, 84 and exits spools 56, 55 via openings 88, 89, out openings 103, 113, from outlets 100, 110, to tubes 42.

After circulating through tubes 42, the heat transfer fluid returns via inlets 101, 111, enters return channels 90, 91, and into relief channel 82, and back to the heat transfer fluid reservoir, via return opening 85. If it is desired to cut off flow of the heat transfer fluid from the tubes, without pivoting the tubes around pivot pin 51, then a suitable control signal is provided, which causes solenoids 59, 60 to release. For example, refer to the right-hand side of the illustration of FIG. 5a. The supply fluid pressure will cause spool 55, for example, to move outwardly, as fluid beyond the end of spool 55 exits via opening 121 and return channel 82. Once spool 55 has reached its outward maximum position (as illustrated in FIG. 5a), the heat transfer fluid will enter spool 55, and exit immediately via aligned openings 89 and 121. Apparatus 50 is configured such that the pressure drop experienced by the heat transfer fluid, when bypassing the heat exchanger loops 42, will be approximately the same, as if the fluid had passed through the loops. Accordingly, flow into and out of apparatus 50 is intended to be constant (except for during cleaning operations) at all times, thus reducing cycling wear on the pumps supplying the heat transfer fluid (among other components).

In the preferred embodiment of the invention, since there must be some small circumferential gap between the spools and the inside surface of the valve bore 53, there will be some leakage past the end of the spools, outwardly, through openings 120 and/or 121, into the return channel 82. When spools 55, 56 are in their closed positions, any leakage past either end of either of the spools will be intercepted by the two circumferential relief grooves 131 or 132 on either side of the respective supply openings 113 or 103, which leakage would then be routed through one of openings 123–126, to return channel 82.

The presence of leakage fluid routes to return, in any of the several operational modes of apparatus 50, means that the need for extensive, high-pressure fluid-tight seals (which would be susceptible to wear) is substantially eliminated.

It is contemplated that the clearance between the caps and the pivot pin will be on the order of 0.005 inches, so as to reduce supply to return leakage. Accordingly, it is contemplated that a filter for the heat transfer fluid will be employed so as to ensure that fine particles (on the order of 0.003 in. diameter) will be filtered out, and kept from interfering with the relative movements of the close-toleranced parts.

Two ring seals, 130 and 150, are provided, which reside in circumferential grooves 133, 134, respectively. Seals 130 and 150 may be high temperature stainless spring-loaded graphite/teflon seals, such as are known under the name BAL-SEAL. Alternatively, if the oil temperature requirements are not too great, O-rings such as are available from AFLAS or KALREZ may be employed.

In a preferred embodiment of the invention, pivot apparatus 50, and connected heat exchange loop(s) 42 will be configured so that there will be a pressure drop, from the supply side inlets to the return side outlets of the pivot apparatus 50 such that the return side pressure will be less than atmospheric. Since the return channel directly opens onto caps 55, 56, this means there will be a net force on the caps tending to hold them onto pivot pin 51. In addition, when the heat exchanger loop(s) are raised out of the cooking oil, the supply is cut off, and the return side empties, again causing a subatmospheric condition in the pivot apparatus 50. Accordingly, in any operating condition, should some leakage due to wear begins to develop, the tendency will always be for the leakage to be inward, into apparatus 50, and not outwardly.

The pivot valve apparatus according to the present invention, is believed to alleviate the need for creating separate valving and pivot apparatus, and will tend to reduce the overall weight and parts requirements for the system.

The present invention, while disclosed in the environment of a commercial fryer, is contemplated as also having utility in other environments, wherein the controlled heating of a potentially flammable liquid or meltable solid is desired, and wherein the reduction in the potential for overheating or ignition of the liquid or melted solid is desired. Other uses in the food manufacturing/preparation industry are possible, such as in candy making. Another potential alternative use could be the heating and melting of waxes or paraffins, in light commercial/industrial environments.

The foregoing description and drawings merely serve to illustrate the invention and the invention is not limited thereto except insofar as the appended claims are so limited, as those skilled in the art who have the disclosure before them will be able to make modifications and variations therein without departing from the scope of the invention.

We claim:

1. A method for heating a predetermined particular volume of liquid comprising:

placing a mass of liquid to be heated in a vessel;

heating a quantity of a heat transfer liquid at a location thermally remote from the vessel;

transporting some of the heated transfer liquid into a position of thermal exchange with the liquid in the vessel, in such a manner that the liquid to be heated and the heat transfer liquid are physically separated, but in a heat transfer relationship so that the heat from the heat transfer liquid is transferred, at least in part, to the liquid to be heated;

sensing the temperature of the liquid to be heated;

providing additional heated heat transfer liquid, to displace the prior heated heat transfer liquid after it has transferred a predetermined amount of heat, while the mass of liquid to be heated remains substantially unchanged;

continuing to replace the heated heat transfer liquid with additional heated heat transfer liquid until the liquid to be heated has attained a predetermined temperature continuing to monitor the temperature of the liquid to be heated; and maintaining the temperature of the liquid when the temperature of the liquid to be heated drops to a predetermined temperature, until the liquid to be heated is raised to a desired temperature; and the step of providing additional heated heat transfer liquid, to replace the prior after it has transferred a predetermined amount of heat further comprises:

reducing the amount of heated transfer liquid transported, as the temperature of the liquid to be heated increases, until the liquid to be heated attains a predetermined temperature.

2. The method for heating a liquid according to claim 1, wherein the liquid to be heated is a cooking oil.

3. The method for heating a liquid according to claim 1, wherein the heat transfer liquid is a non-toxic mineral oil.

4. An apparatus for heating a predetermined particular volume of liquid, comprising:

a vessel for containing a first mass of liquid to be heated to a desired temperature;

means for heating a second, heat transfer liquid to a desired temperature, operably disposed at a location thermally remote from the vessel;

means for storing the heated heat transfer liquid;

means for transporting some of the heated heat transfer liquid from the means for storing heated heat transfer liquid to the vessel for containing the first mass of liquid to be heated;

means for enabling transfer of heat from the transported heated heat transfer liquid to the first mass of liquid to be heated, operably connected in a fluid transporting relationship with the means for transporting heated heat transfer liquid, while preventing physical contact between the first liquid and the heat transfer liquid, while the first mass of liquid to be heated remains substantially unchanged means for monitoring the temperature of the first liquid; and means for replacing the transported heated heat transfer liquid with additional heated heat transfer liquid, when the transported heated heat transfer liquid has substantially completed transfer of heat to the first liquid; wherein the means for replacing the transported heated heat transfer liquid with additional heated heat transfer liquid, further comprises means for reducing each subsequent amount of heated heat transfer liquid replacing a preceding amount, as the temperature of the liquid to be heated increases, until the liquid to be heated attains a predetermined temperature.

5. The apparatus according to claim 4, wherein the means for heating a second, heat transfer liquid comprises a gas burner.

6. The apparatus according to claim 4, wherein the means for storing heated heat transfer liquid comprises:

a supply manifold for holding heat transfer liquid; and a supply heat exchanger operably disposed in a heat conducting relation between the means for heating the heat transfer liquid and the supply manifold.

7. The apparatus according to claim 6, wherein the means for transporting heated heat transfer liquid from the means for storing heated heat transfer liquid to the vessel for containing the first liquid comprises at least one liquid transporting member operably connected to the supply manifold, for enabling transport of heat transfer liquid back and forth between the supply manifold and the vessel.

8. The apparatus according to claim 7, wherein the means for enabling transfer of heat from the heated heat transfer liquid to the first liquid comprises a vessel heat exchanger member, operably connected to the at least one liquid transporting member, for immersion in the first liquid within the vessel.

9. The apparatus according to claim 8, further comprising pumping means operably disposed between the vessel heat exchanger and the supply manifold.

10. The apparatus according to claim 4, wherein the heat transfer liquid is a non-toxic mineral oil.

11. The apparatus according to claim 4, wherein the first liquid to be heated is cooking oil.

* * * * *